(12) United States Patent
Dornbush et al.

(10) Patent No.: US 9,792,578 B2
(45) Date of Patent: Oct. 17, 2017

(54) MANAGING INFORMATION ABOUT INVENTORY

(71) Applicant: Google Inc., Mountain View, CA (US)

(72) Inventors: Sandor Dornbush, Mountain View, CA (US); Tajinder Gadh, Mountain View, CA (US); Matt Van Der Staay, Mountain View, CA (US); Jasper Lin, Monterey Park, CA (US)

(73) Assignee: Google Inc., Mountain View, CA (US)

( * ) Notice: Subject to any disclaimer, the term of this patent is extended or adjusted under 35 U.S.C. 154(b) by 875 days.

(21) Appl. No.: 14/048,938

(22) Filed: Oct. 8, 2013

(65) Prior Publication Data

US 2015/0100465 A1    Apr. 9, 2015

(51) Int. Cl.
  *G06Q 10/00*    (2012.01)
  *G06Q 10/08*    (2012.01)
(52) U.S. Cl.
  CPC .................................. *G06Q 10/087* (2013.01)
(58) Field of Classification Search
  None
  See application file for complete search history.

(56) References Cited

U.S. PATENT DOCUMENTS

| | | | | |
|---|---|---|---|---|
| 6,148,291 A * | 11/2000 | Radican | ................. | G06Q 10/08 705/22 |
| 6,879,962 B1 * | 4/2005 | Smith | ................. | G06Q 10/025 705/1.1 |
| 7,047,220 B2 * | 5/2006 | Taguchi | ................. | G06Q 40/04 705/26.1 |
| 7,092,929 B1 * | 8/2006 | Dvorak | ................. | G06Q 10/087 705/28 |
| 2003/0101107 A1 | 5/2003 | Agarwal et al. | | |
| 2003/0171996 A1 * | 9/2003 | Chen | ................. | G06Q 10/08 705/26.81 |
| 2003/0187758 A1 * | 10/2003 | McKalko | ................. | G06Q 10/087 705/29 |
| 2003/0195904 A1 * | 10/2003 | Chestnut | ................. | G06F 21/6227 |
| 2007/0282694 A1 * | 12/2007 | Gould | ................. | G06Q 10/087 705/14.39 |
| 2008/0162305 A1 | 7/2008 | Rousso et al. | | |

(Continued)

OTHER PUBLICATIONS

International Search Report and Written Opinion dated Feb. 17, 2017 as received in Application No. PCT/US2014/054996.

*Primary Examiner* — Fateh M Obaid
(74) *Attorney, Agent, or Firm* — Morris & Kamlay LLP

(57) ABSTRACT

Disclosed are methods for managing inventory in e-commerce. A method may be provided that may include segmenting a quantity of a specific product in inventory into a plurality of inventory leases having a smaller quantity of the specific product. A lease management server may distribute at least one inventory lease. At least one of the specific products may be selected by the inventory management server for reservation. A rate of selection of the specific products from each of the respective inventory leases may be determined. The determined rate of selection may be analyzed to determine when the quantity in the respective inventory lease will reach a minimum quantity in the respective inventory lease. An indication of when a request for a new inventory lease is to be sent to the lease manager server may be provided.

22 Claims, 7 Drawing Sheets

(56) References Cited

U.S. PATENT DOCUMENTS

| | | | |
|---|---|---|---|
| 2009/0070237 A1* | 3/2009 | Lew | G06Q 10/087 |
| | | | 705/28 |
| 2009/0276669 A1* | 11/2009 | Hoopes | G06Q 10/087 |
| | | | 714/746 |
| 2010/0145921 A1* | 6/2010 | Stanley | G06F 17/30575 |
| | | | 707/706 |
| 2010/0262512 A1* | 10/2010 | Lee | G06F 17/3087 |
| | | | 705/26.1 |
| 2011/0125566 A1* | 5/2011 | McLaughlin | G06Q 20/20 |
| | | | 705/14.23 |
| 2012/0054076 A1 | 3/2012 | Wu et al. | |
| 2012/0148267 A1* | 6/2012 | Kawai | G03G 15/5079 |
| | | | 399/8 |
| 2012/0221430 A1 | 8/2012 | Naghmouchi et al. | |
| 2012/0221434 A1* | 8/2012 | Inskeep | G06Q 10/087 |
| | | | 705/26.8 |
| 2016/0012465 A1* | 1/2016 | Sharp | G06Q 20/18 |
| | | | 705/14.17 |

\* cited by examiner

MANAGING INFORMATION ABOUT INVENTORY

BACKGROUND

Online store inventory management systems control the allocation and distribution of millions of products annually. When a particularly popular product is sold, especially high rates of sales may occur. In these situations, traditional commerce sites built on a small number of database machines may be affected by resulting high latency, interrupted availability, and/or excessive operation cost.

As a result, conventional management systems may allocate inventory of the product in a manner to address changing sales numbers in different regions, in which an online store is selling the product at a higher rate than other locations. As a result, the system may be unable to satisfy the volume of product sales because the system cannot accurately track the inventory of the product due to system latency and configuration.

BRIEF SUMMARY

According to an implementation of the disclosed subject matter, a method may be provided that may include segmenting a quantity of a specific product in inventory into a plurality of inventory leases having a smaller quantity of the specific product. Each inventory lease for the specific product may have an expiration time unique to the respective inventory lease and may include a maximum number of specific products covered by the inventory lease. At least one of the plurality of inventory leases for the specific products may be distributed. At least one of the specific products may be selected by an inventory management server from at least one of the plurality of distributed inventory leases to the inventory management server. In response to the selection of the at least one of the specific products, the quantity of specific product in the at least one of the plurality of inventory leases may be decremented by the number of selected specific products. A rate of selection of the specific products from each of the respective inventory leases may be determined. The determined rate of selection may be analyzed to determine when the quantity in the respective inventory lease may reach a minimum quantity in the respective inventory lease. A rate of selection of the specific products or a velocity of sales, from each of the respective inventory leases may be determined. The determined rate of selection may be analyzed to determine when the quantity in the respective inventory lease may reach a minimum quantity in the respective inventory lease. An indication of when a request for a new inventory lease is to be sent may be generated.

According to an implementation of the disclosed subject matter, a method may be provided that may include receiving, by a processor, an inventory lease for a specific product available for distribution. The inventory lease may include a leased quantity of the specific product and an expiration of the inventory lease. In response to an order indication for an ordered quantity of the specific product received over a communication pathway with a plurality of network front end systems, the ordered quantity of the specific product may be reserved according to the order indication as being unavailable for distribution from the leased quantity of the specific product in the inventory lease. The remaining quantity of the specific product in the inventory lease that is available for distribution may be determined. In response to a determination that the remaining quantity available for distribution has reached a threshold amount or generation of an inventory lease expiration warning signal, a request for a new inventory lease having an additional leased quantity of the specific product may be transmitted.

According to an implementation of the disclosed subject matter, a method may be provided that may include identifying a total quantity of an inventory of a specific product for distribution. Data related to sales of the specific product may be obtained from external systems handling sales of the specific product and analytical data related to the specific product. A first sub-quantity of the total quantity may be allocated to an inventory lease based on the obtained data. Based on the obtained data, an expiration of the inventory lease may be calculated. In response to a request, the inventory lease may be assigned to an external source. Updated data related to sales of the specific product, any external systems handling sales of the specific product, and analytical data related to the specific product may be analyzed in response to a subsequent request for an additional inventory lease from the external source. Based on the results of the updated data analysis, a second sub-quantity may be allocated to the additional inventory lease and a new expiration of the additional inventory lease may be calculated. The additional inventory lease may be assigned to the external source.

Additional features, advantages, and implementations of the disclosed subject matter may be set forth or apparent from consideration of the following detailed description, drawings, and claims. Moreover, it is to be understood that both the foregoing summary and the following detailed description may include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
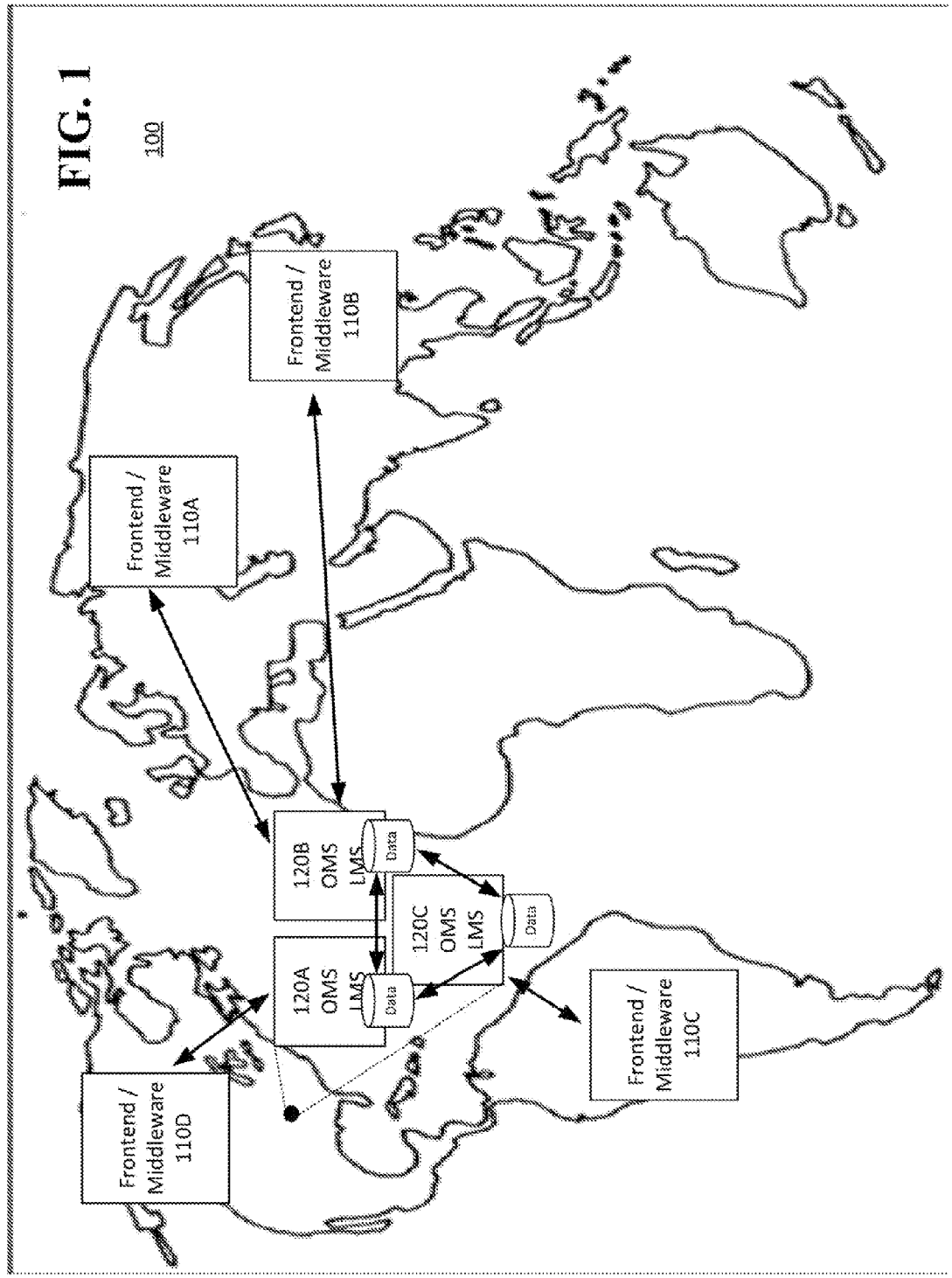
FIG. 1 shows a block diagram of an online product procurement system configuration according to an implementation of the disclosed subject matter.

FIG. 1 shows a block diagram of an online product procurement system configuration according to an implementation of the disclosed subject matter. The online product procurement system 100 may provide an online store inventory management system that may efficiently present products for purchase to a large number of customers with minimal network downtime and few processing bottlenecks. Users may interact with the system 100 to purchase products online. The system 100 may provide all of the functions needed to allow the input of user information including user identification, payment information, shipping information, product information and other information. In addition, the system 100 may include logistical information for distributing purchases products, such as shipping information, shipper information and other information. The system 100 may also measure the status and progress of sales (such as volume of sales, velocity of sales (which is the rate of sales in a given time period), pending purchases (e.g., the product is in an online shopping cart or the user has indicated an intent to purchase the product but an approval for the user's credit is pending), completed purchases, and the like. In some configurations, the system may provide product location and purchase assistance and information, such as product search functions, product recommendations and reviews, and the like. In addition, the system 100 may accommodate failures at different nodes through the application of efficient failover techniques.

In an implementation, a number of data centers 110A-110D may provide the interface of the system 100 with the users (i.e. customers). Each data center 110A-D may include, for example, a front end interface, a middleware layer, such as a store infrastructure, an inventory management server (IMS), which may include a number of servers, processors and other devices. The data centers 110A-D may be the point-of-contact for a user that is looking to procure a product from the online store. For example, a user in Southeast Asia may access the internet and interact with the online store network through the front end in data center 110B. Of course, a user in South America may also interact with the front end in data center 110B as well, but would more than likely access the store through data center 110C. The data centers 110A-D may be coupled to one or more of product distribution centers 120A-C. Each product distribution center 120A-C may include, for example, an order management server (OMS), a lease management server (LMS) and a data store. The product distribution centers 120A-C may interact with one another to exchange data, services and resources. The configuration of the online product procurement network 100 may be modified and is not limited to the configuration shown in FIG. 1. For example, the functionality of IMS in data center 110A may be provided by the product distribution centers 120B or by a separate entity.

Figure 2:
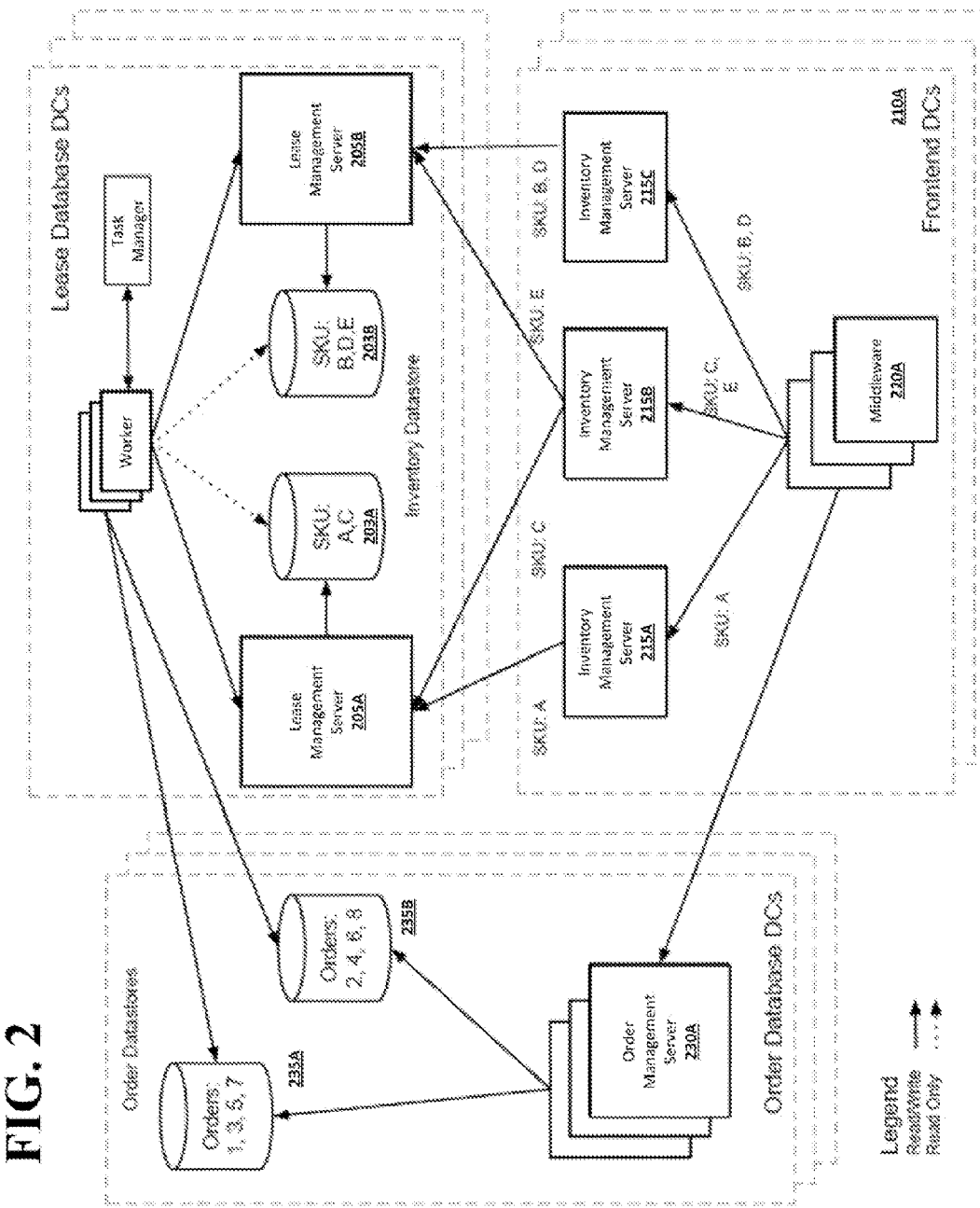
FIG. 2 shows additional details of the online store system according to an implementation of the disclosed subject matter.

FIG. 2 shows additional details of the online store network according to an implementation of the disclosed subject matter. The online store network 200 may include a plurality of inventory datastore, such as data stores 203A and 203B, a plurality of lease management servers (LMS) 205A and 205B, a plurality of individual datacenters 210A-210N, a plurality of order management servers 230A and a plurality of order datastores 235A and 235B.

Each of the individual datacenters 210A-210N may include a plurality of inventory management servers, such as servers 215A-C, and a plurality of servers or components that implement a store infrastructure or similar middleware 220A. A user may, for example, access an individual datacenter 210A via the middleware infrastructure 2220A. For example, the store component 220A may be communicatively coupled to one or more of the web front ends shown in FIG. 1. Specific products may be identified by a product identifier code, such as an SKU code. For purposes of illustration, SKUs of individual products A-E are represented by their respective letters A-E. Individual inventory management servers 215A-C may handle all data for specific SKUs. For example, inventory management server 215A may be assigned to handle all data for product A that has an SKU of A, while inventory management server 215B may be assigned to handle all data for products C and E that have SKUs of C and E, respectively. Similarly, each of the lease management servers 205A and 205B may handle all data for individual products, such as products A and C. For example, as shown in FIG. 2, lease management server 205A may handle data related to products A and C that are identified by SKUs A and C, respectively, and lease management server 205B may handle data related to products B, D and E that are identified by SKUs B, D and E, respectively.

Order management servers 230A may track and maintain the status of any pending and completed orders for the respective specific products. The data related to the particular orders may be stored in a respective order datastore. For example, data related to orders 1, 3, 5 and 7 may be stored in order datastore 235A, while data related to orders 2, 4, 6 and 8 may be stored in order datastore 235B.

Figure 3:
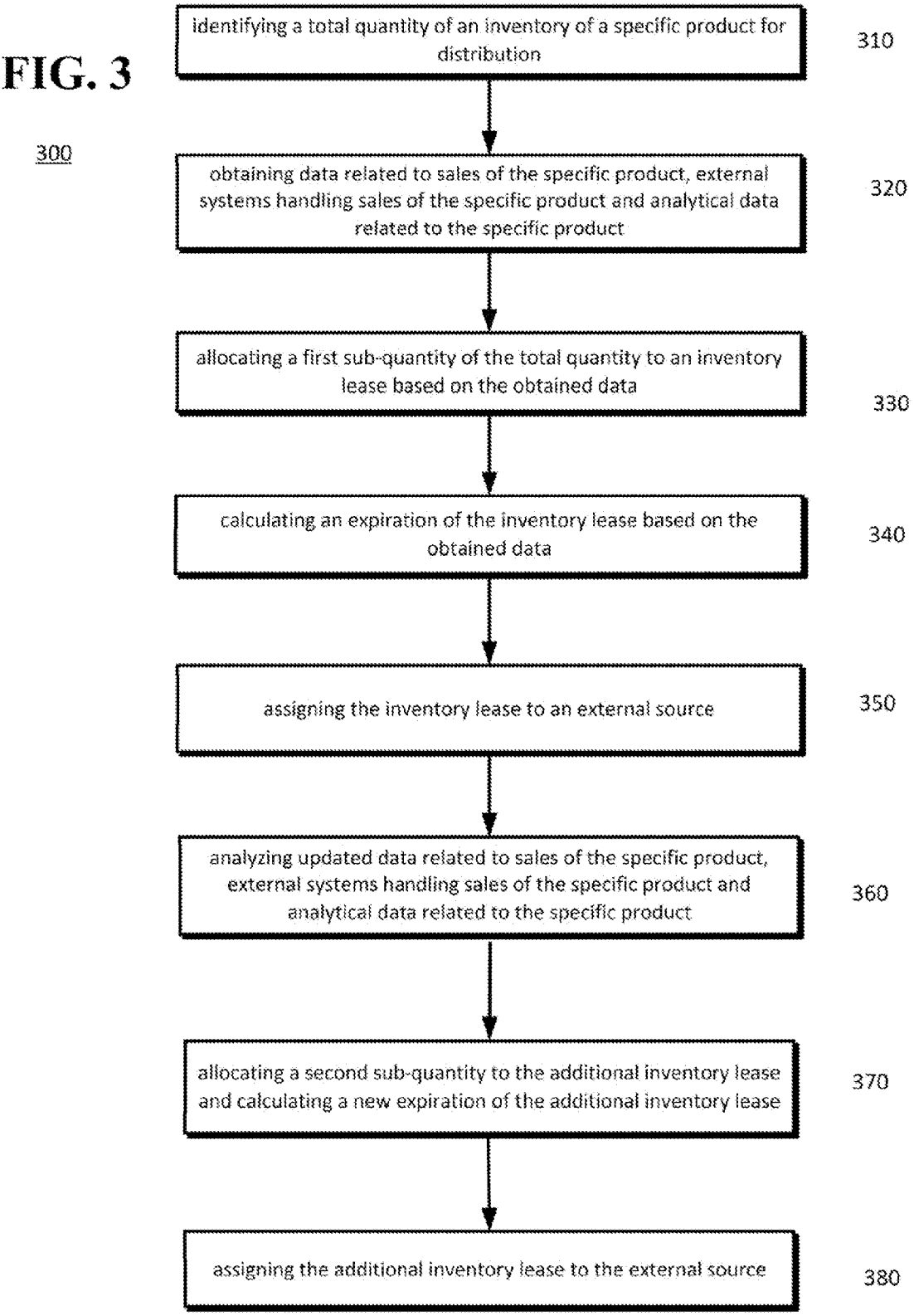
FIG. 3 shows a systematic process according to an implementation of the disclosed subject matter.

FIG. 3 shows a process according to an implementation of the disclosed subject matter. The lease management server 205A may perform the following process to provide an optimal supply of a specific product for presentation to a customer. A benefit of the disclosed process 300 is that it provides a well-managed and efficient distribution of inventory of a specific product for presentation to a user regardless of how quickly products may be selected for purchase by customers. For example, a lease management server may identify a total quantity of an inventory of a specific product for distribution (310). For example, a new highly-anticipated electronic device or other product, such as a child's toy, may be scheduled for availability for purchase on a particular date through an online store. The number of products available for that particular day may number several hundred-thousand units such as, for example, 500,000 units. Embodiments of the disclosed subject matter may be suitable for volumes of several tens of thousands, hundreds of thousands, millions, tens of millions, or more units per hour. The specific quantities described herein are provided as illustrative examples only, and are not limiting of the capacity of the disclosed systems and techniques. The lease management server may determine that the total quantity of inventory of the specific product for distribution to be the number of products available for that particular day, which can be, for example, the original 500,000 units. At 320 the lease management server may obtain various types of other data related to the product. For example, the lease management server may obtain data related to sales of similar products, or, after the product is available for selection, sales of the specific product; external systems handling sales of the specific product; and/or analytical data related to the specific product. A sale may be an actual purchase, an indication of intent-to-purchase, a "give-away" event such as a promotional item, or the like. Information such as the number of sales of the specific products, the velocity of the sales, which may be measured in the number of sales per minute or seconds, the general locations of the sales of the specific products, and similar information. The lease management server may also receive information related to advanced sales, forecasted sales, forecasted velocity of sales and other similar data based on surveys or other market research. The data may be obtained, for example, from one or more of an order management server, the store infrastructure, an inventory management server, other lease management servers or a datastore, such as datastores 203A, 203B, 235A, 235B as shown in FIG. 2.

At step 330, a first sub-quantity of the total quantity may be allocated to an inventory lease based on the obtained data. For example, the first sub-quantity may be the total quantity divided by a number of the total inventory leases available, such as 5,000. Alternatively, the first sub-quantity and subsequent sub-quantities for other inventory leases may be determined to be allocated to an inventory lease based on, for example, a velocity, or anticipated velocity, of sales of the specific product. Each inventory lease may expire within a determined time from when the inventory lease is assigned. For example, the lease management server may calculate an expiration of the inventory lease based on the obtained data (340). For example, if the velocity of sales is high, the expiration date may be set to be a short amount of time in anticipation that the respective inventory lease may be assigned to a system servicing a slow selling region, and that system servicing a faster selling region may need additional quantities of the specific products. Alternatively, if sales of the specific product are slow system-wide, the expiration may be set to be longer. The expiration may be based on a timer measuring seconds, minutes, hours, days, date or a combination thereof, a counter that measures number of transactions, a number of click-throughs with regard to links related to the specific products, a number of looks, and the like, or some other parameter, such as a specific time of day, for expiring the inventory lease. With a set sub-quantity of a specific product and an expiration date, the inventory lease may be assigned to an external source (350). The assignment of the inventory lease to an external source may be in response to a request from the external source, such as an inventory management server.

A lease management server may also analyze updated data related to sales of the specific product, external systems handling sales of the specific product and analytical data related to the specific product. For example, the total quantity of the specific product may be reduced based on the reservation of product for purchase, completed sales and the like. The remaining quantity of the specific product, for example, 400,000 units, may be segmented into, or divided (either evenly or unevenly) among subsequent inventory leases for assignment to external sources, whose inventory leases have, for example, expired or sold out. The analysis may be in response to a subsequent request from the external source for an additional inventory lease (360). A second sub-quantity of the remaining quantity products to the additional inventory lease may be determined as an optimal quantity for the inventory lease, and a new expiration of the additional inventory lease may be calculated. The second sub-quantity may be, for example, based on at least one of: location of a data center that is directly contacted by a customer, a product country, a remaining inventory of the specific product, a global consumption rate of the specific product, a locale specific consumption rate, an inventory management server consumption rate, peak load time for an inventory management server, a current time of day, historical sales trend for a product similar to the specific product, or an estimated sell out date. Both the optimal quantity and the new expiration may be calculated based on the results of the data analysis (370). The expiration time for each inventory lease may be determined using a velocity of sales of the specific product covered by the inventory lease. For example, if sales are slower than anticipated in a particular geographical region being serviced by a first external source, an inventory lease with a larger quantity and shorter expiration time may be assigned to a second external source that has a greater sales velocity. As a result, the system may dynamically allocate more quantities of products to areas that are selling products at higher velocity thereby eliminating delays or failures due to a lack of available inventory. The additional inventory lease may be assigned to the external source (380). The additional inventory lease may be assigned by the lease management server.

The lease management server also may perform analytics. For example, the lease management server may aggregate the inventory information from all inventory management server instances on a per product basis. The lease management server may use the inventory information, for example, to calculate optimal lease sizes for each data center that requests a lease. The quantity of a specific product in a lease may be based on one or more of the following: data center location, product country, remaining product inventory (i.e. total quantity of a specific product), a global consumption rate of the specific product, a locale specific consumption rate of the specific product, an inventory management server instance consumption rate, peak load times/current time of the day, historical trends of similar products, and an estimated sellout date for the specific product. Using this date, the lease management server may determine the appropriate quantity to assign in the lease and what the appropriate expiration date should be. The quantity of each lease may follow a particular allocation strategy. For example, if sellout of the product may not happen for greater than one day, then there may be no reduction from the previous lease. The lease management server will assign leases with maximum size leases, such as, for example, a maximum of 1000 units or 1% of units in stock. Alternatively, if sellout of the product may happen within less than one day, the lease quantity may be reduced linearly by a consumption rate of the specific product. Or, if sellout of the specific product may happen within less than one hour, all inventory lease assignments may concentrate all remaining stock to inventory management servers in a top few datacenters.

Figure 4:
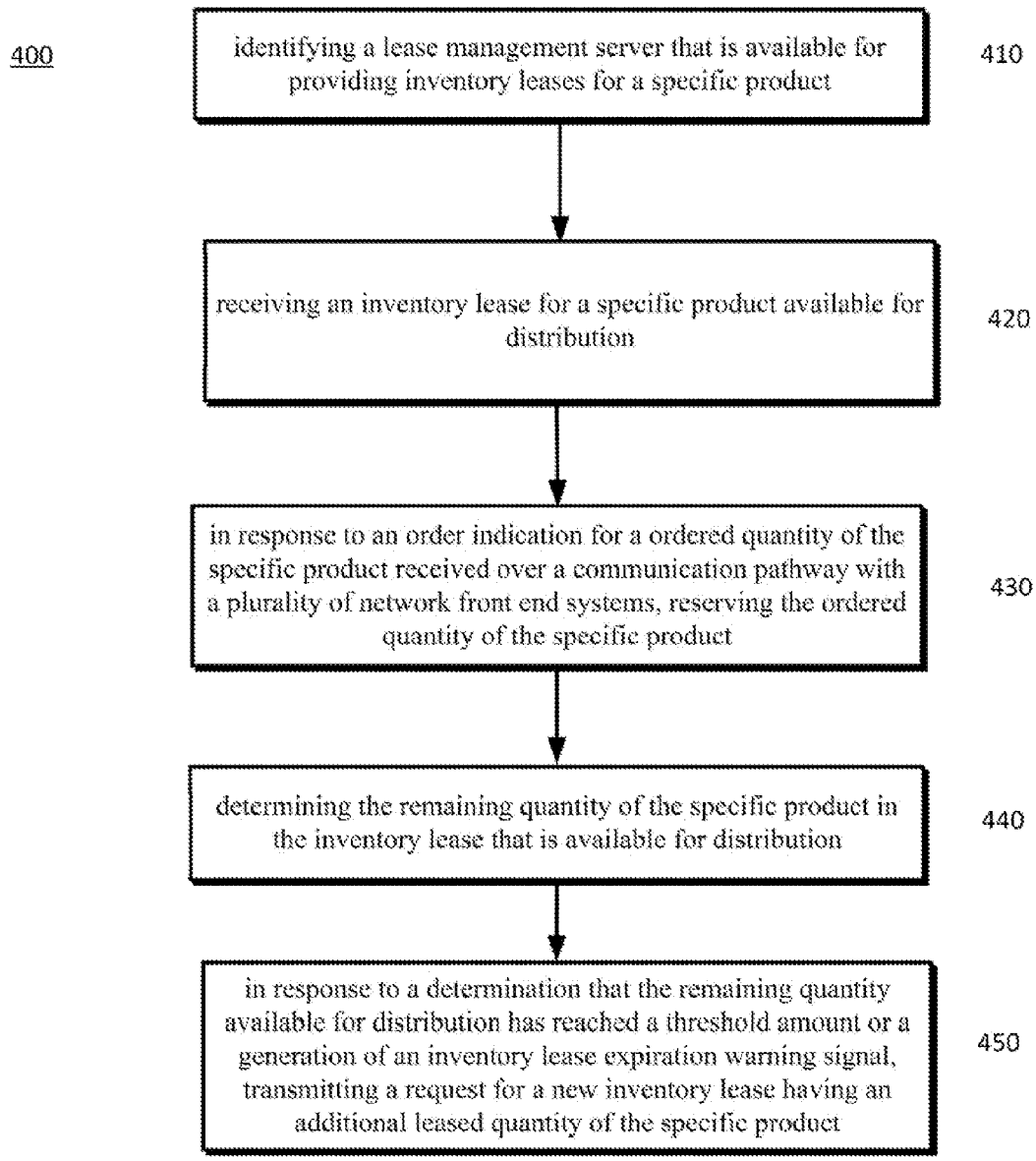
FIG. 4 shows another process according to an implementation of the disclosed subject matter.

FIG. 4 shows another process according to an implementation of the disclosed subject matter. An inventory management server, such as server 215A in FIG. 2, may be configured to manage inventory and execute the process 400 illustrated in FIG. 4. For example, the inventory management server may identify an available lease management server for providing inventory leases for a specific product (410). The inventory management server may identify available lease management servers by performing a hash function to obtain a set of lease management servers that are a set of active lease management servers. The active lease management servers are the servers that are available to the inventory management servers. From the set of active, available lease management servers, a master lease management server may be selected from the set of active servers may be selected by known master-slave selection processes. An inventory lease for a specific product available for distribution may be received by a processor of the inventory management server (420). The inventory lease may include a leased quantity (i.e. one of the sub-quantities of the specific product total quantity described above with respect to FIG. 3) of the specific product and an expiration of the inventory lease. The expiration of the inventory lease is similar to the expiration explained above. In response to an order indication for an ordered quantity of the specific product received over a communication pathway with a plurality of network front end systems, the ordered quantity of the specific product may be reserved according to the order indication as being unavailable for distribution from the leased quantity of the specific product in the inventory lease (430). The order indication may be a signal indicating a number of the specific product that has been ordered by customers. Ordered products may be those products that are selected for purchase by a user or by an order management system, such as 230A of FIG. 2. "Ordered" products may be considered products that a user has placed in a shopping cart in the on-line store, those products for which a purchase transaction has been completed, or product sales that are pending such as waiting for verification of user funds or credit approval.

The inventory management server may also collect telemetry information on inventory checks and inventory consumption for individual products. This telemetry information may be returned to a lease management server when it fetches additional leases. At step 440, the remaining quantity of the specific product in the inventory lease that is available for distribution may be determined. For example, the order indication may be used by the inventory management server to perform a calculation of the remaining quantity or adjust a counter based on the initial quantity of a specific product allocated to the respective inventory lease. In response to a determination that the remaining quantity available for distribution has reached a threshold amount or a generation of an inventory lease expiration warning signal, transmitting a request for a new inventory lease having an additional leased quantity of the specific product. In response to a determination that the remaining quantity available for distribution has reached a threshold amount or a generation of an inventory lease expiration warning signal, a request for a new inventory lease having an additional leased quantity of the specific product may be generated and transmitted by the inventory lease management system (450). Alternatively, additional inventory leases may be requested either prior to the expiration of a current lease or when the remaining quantity of the specific product is below a certain threshold. The certain threshold may be determined, for example, based on analytics of the sales and order data related to the specific product. In addition, the frequency of the lease request may change based on analysis of the sales and order data related to the specific product. In an implementation, the inventory management server and the lease management server may be located in different geographical areas that may cause latency in communication between the servers. In an attempt to eliminate the latency, the inventory management server may prefetch an inventory lease from a lease management server when an expiration of a current lease is approaching or the remaining inventory is below the certain threshold. In another implementation, when the prefetch occurs in these situations, the prefetch may be based on the number of requests that the inventory management server may have received for a particular item. If the item is popular and has many requests then prefetching may occur sooner. For example, the certain threshold for remaining quantities may be set at a higher quantity or a time before the expiration may be longer. Conversely, if the item is unpopular and sales are slow, and there are fewer requests for additional leases, the inventory management server may prefetch later than when sales are at a forecasted pace or fast, or not at all.

The inventory management server may also perform other functions, such as identifying a lease management server that may be available for providing inventory leases for the specific product. The identification of the lease management server may be performed using a hash function to obtain a set of lease management servers that are a set of active servers. The hash function may take different forms and may be used to find the identification of the active server set. For example, a hash function may use as an input the SKU of the specific product and the country that is being serviced by the lease management server (e.g., lms_id=hash(sku, country), where lms_id is an identifier of a lease management server).

Figure 5:
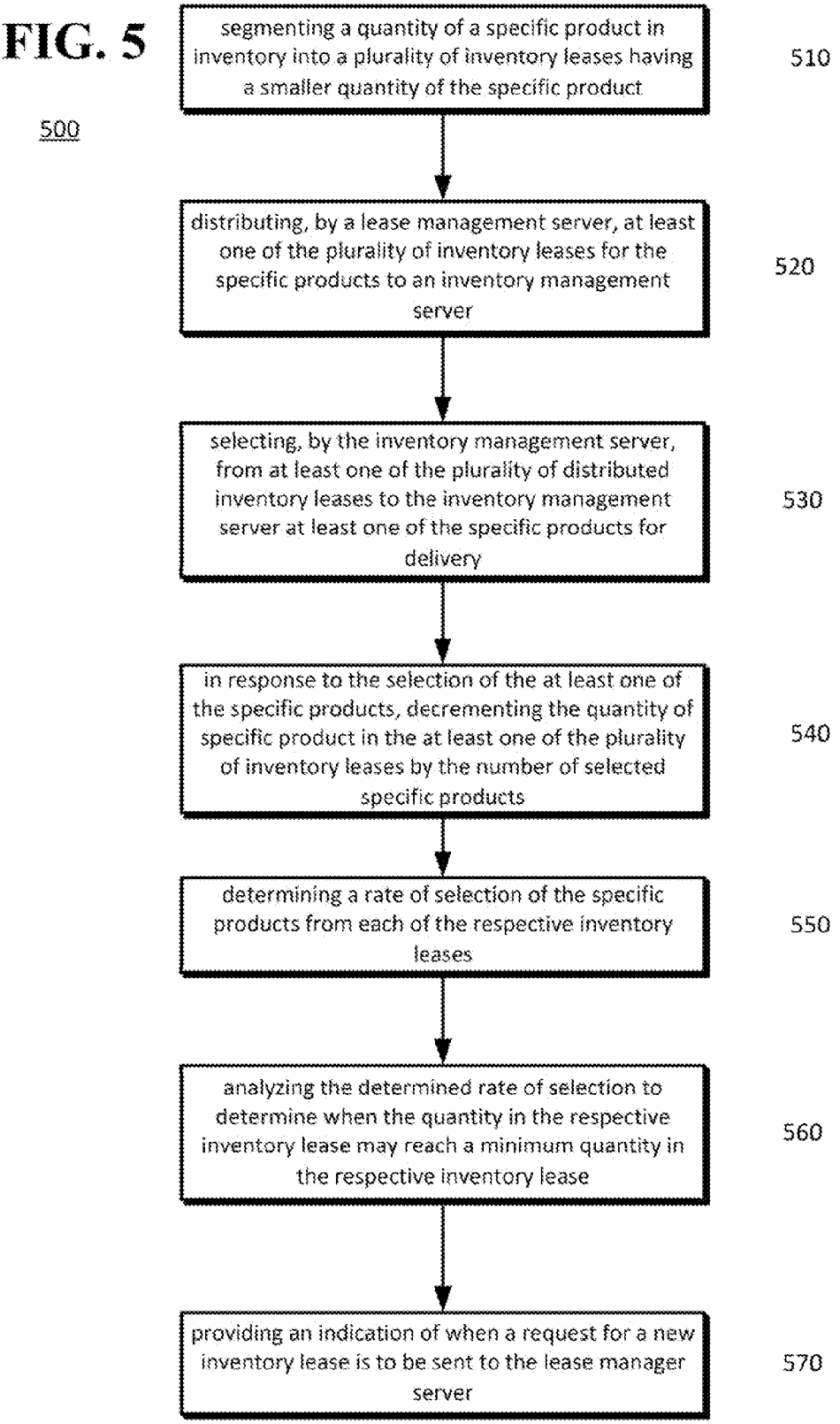
FIG. 5 shows another process according to an implementation of the disclosed subject matter.

FIG. 5 shows a systematic process according to an implementation of the disclosed subject matter. For example, the process 500 may include segmenting a quantity of a specific product in inventory into a plurality of inventory leases having a smaller quantity of the specific product (510). The segmentation of the quantity of the specific product in inventory may be performed by aggregating data from all inventory management servers related to the specific product. Based on an analysis of the aggregated data, an optimal quantity for an inventory lease for distribution may be calculated. The optimal quantity may, for example, be based on at least one of location of a data center that is directly contacted by a customer, a product country, a remaining inventory of the specific product, a global consumption rate of the specific product, a locale specific consumption rate, an inventory management server consumption rate, peak load time for an inventory management server, a current time of day, historical sales trend for a product similar to the specific product, or an estimated sell out date.

A processor in the lease management server may have access to the total quantity of the specific product and may perform the segmenting of the quantity into small quantities that may be assigned to a plurality of leases. The quantities may be assigned prior to the creation of the inventory leases or may be dynamically assigned as requests for an inventory lease are received. For example, the maximum number of specific products to be covered by the inventory lease may be determined based on a velocity of sales (i.e., number of products are being sold in time period) of the specific product. Each inventory lease for the specific product may have an expiration time unique to the respective inventory lease and may include a maximum number of specific products covered by the inventory lease. Different sales scenarios may influence how quantities of the specific product are allocated to an inventory lease. For example, a maximum quantity of the specific product may be allocated to the inventory lease based on a calculation that the specific product will sell out in more than one day, a reduced quantity of the specific product may be allocated to the inventory lease based on a calculation that the specific product will sell out in less than one day, or a quantity of the specific product may be allocated to a reduced number of inventory leases that may be distributed to selected top selling data centers based on a calculation that the specific product will sell out in less than one hour or some other short time frame. Of course, other sales scenarios may be possible and be accommodated by the system.

The lease management server may distribute at least one of the plurality of inventory leases for the specific products to an inventory management server (520). At least one of the specific products may be selected by the inventory management server from at least one of the plurality of distributed inventory leases to the inventory management server (530). The selection may be, for example, in response to a sale reservation of the selected specific product(s). Based on the selection, the selected specific product may be identified for delivery, for example, to a vendor for shipping the product to a customer or directly sending the product to a customer. In an implementation, the selection may be in response to a sale reservation of the selected specific product(s) by a customer, a server or other device. In response to the selection of the at least one of the specific products, the quantity of specific product in the at least one of the plurality of inventory leases may be decremented by the number of selected specific products (540). Of course, other methods may be used for tracking selection of the at least one of the specific products. For example, a counter may be incremented as products are selected.

A rate of selection of the specific products or a velocity of sales, from each of the respective inventory leases may be determined (550). The determined rate of selection may be analyzed to determine when the quantity in the respective inventory lease may reach a minimum quantity in the respective inventory lease (560). An indication of when a request for a new inventory lease is to be sent to the lease manager server may be provided, for example, to a lease management server (570). An expiration time for each inventory lease may be determined using a velocity of sales of the specific product covered by the inventory lease.

The system may also perform status checks of the different servers. For the middleware infrastructure or another component may perform a status check that may determine that the identified inventory management server is operating properly and within parameters related to selections of the related products. Alternatively, in response to a determination that the identified inventory management server is not operating properly, a hash function may be performed to identify a properly operating inventory management server. For example, inputs to the hash function may include a product SKU identifier and a country related to distribution of the specific product. A hashing algorithm, such as one based on Consistent hashing, may be used to determine an active inventory management server. For example, systems as disclosed herein may attempt to locate an active inventory management server using the following process:

1. Using Consistent hashing or a similar algorithm, calculate a sequence of inventory management servers (IMS_1, IMS_2, . . . IMS_N) for a given ProductID (SKU, country). The initial server IMS_1 and following sequence may differ for each ProductID for uniform load balancing.
2. Each client may first attempt to contact the initial IMS_1 for a given ProductID.
3. If the primary server IMS_1 is unreachable, the request may be retried on a secondary server IMS_2, followed by a tertiary server IMS_3.
4. Each request may be retried up to a specified number of servers IMS_N, such as 3, before failing the request.

In addition, the system may determine that a user connection to an inventory management server is unavailable, and in response may identify a different inventory management server using a hash function to take over the functions of the unavailable inventory management server.

From time to time, a consumer may select a product for purchase and indicate that the product should be placed in the consumer's shopping cart. These may be considered product orders. However, the consumer may not complete the sale or the sale may fail due to payment issues, and while the order is pending, it has effectively been abandoned. For example, an abandoned order may be the result of canceled, expired shopping carts or orders that are not completed in time, for example, because of an incorrect credit card number or the like. The system may periodically or after some event reclaim this reserved inventory from the order management system. The order management system or the lease management system may perform the reclamation process. The system may read orders that have been abandoned in an order management server, and may sum a quantity of the specific product from each of the read orders. The sum of the specific products may be allocated back to the lease management server for allocation into an inventory lease. The reclamation process may be performed offline or when network traffic is at a minimum by a backend processor.

At times, different components of the system illustrated in FIG. 2 may fail or have degradation in performance. In order to cope with these situations, different failover scenarios may be implemented. For example, with reference to FIG. 2, an IMS may fail or become unreachable. For example, the link pertaining to SKU A products between inventory management server 215A and lease management server 205A may be broken, or the SKU A product link between the inventory management server 215A and the infrastructure 220A may be broken. In such a situation, an alternate means of servicing customers wishing to purchase SKU A products may be found. In an implementation, another inventory management server, such as inventory management server 215B, may be called within the same individual data center, such as individual data center 210A. In this example, inventory management server 215B may be the backup server for SKU A products. As shown in FIG. 2, inventory management server 215B processes SKU C and E products, and in order to process SKU A products an inventory lease for SKU A products may be requested from lease management server 205A. Once the inventory lease for the SKU A products is received by the inventory management server 215B, it may begin processing SKU A product requests from the store infrastructure 220A. The infrastructure also may need to determine which of the plurality of inventory management servers 215B or 215C is handling the SKU A product requests. The identification of the responsible inventory management server may be determined using the hash functions described above. If inventory leases are available for the SKU A products then no delays will be evident at a customer device.

As another example, an LMS may fail or become unreachable. An LMS may be sharded, for example by product and country combination. In the case of a full failure on a single shard, only a subset of products may be affected. Each LMS may maintain an in-memory copy all the inventory available for a specific product. Additionally, it may store a list of prefetched leases that it maintains and provides in response to service requests. Thus, in the case of a storage layer or database failure, datastore operations may be limited to reduce latency. In addition, if the datastore is down when a request for a new lease is received, the LMS may service the request with a prefetched lease. The amount prefetched may be a function of, for example, a remaining inventory level and/or how rapidly the product is selling. This may allow for product sales to continue through temporary datastore outages. If there is a longer outage and the store of prefetched leases is exhausted, then only the subset of products stored on the individual shard may be unavailable until datastore operations are restored.

In another example of addressing LMS failure, an individual data center may include 3 replicas. Of these, one may be elected as the "master" service, and will service all requests. Slave services may fail or be downed for maintenance with few or no side effects, since they are not serving active traffic. If the master instance fails, one of the replicas may become the new master and continue serving request traffic.

As another example, an IMS may request leases before existing leases expire or run out. This may prevent latency from becoming noticeable for users. It also may reduce the apparent and/or actual effect of any LMS failover and failures, because any temporary disruption in service may be hidden by the prefetch time.

Figure 6:
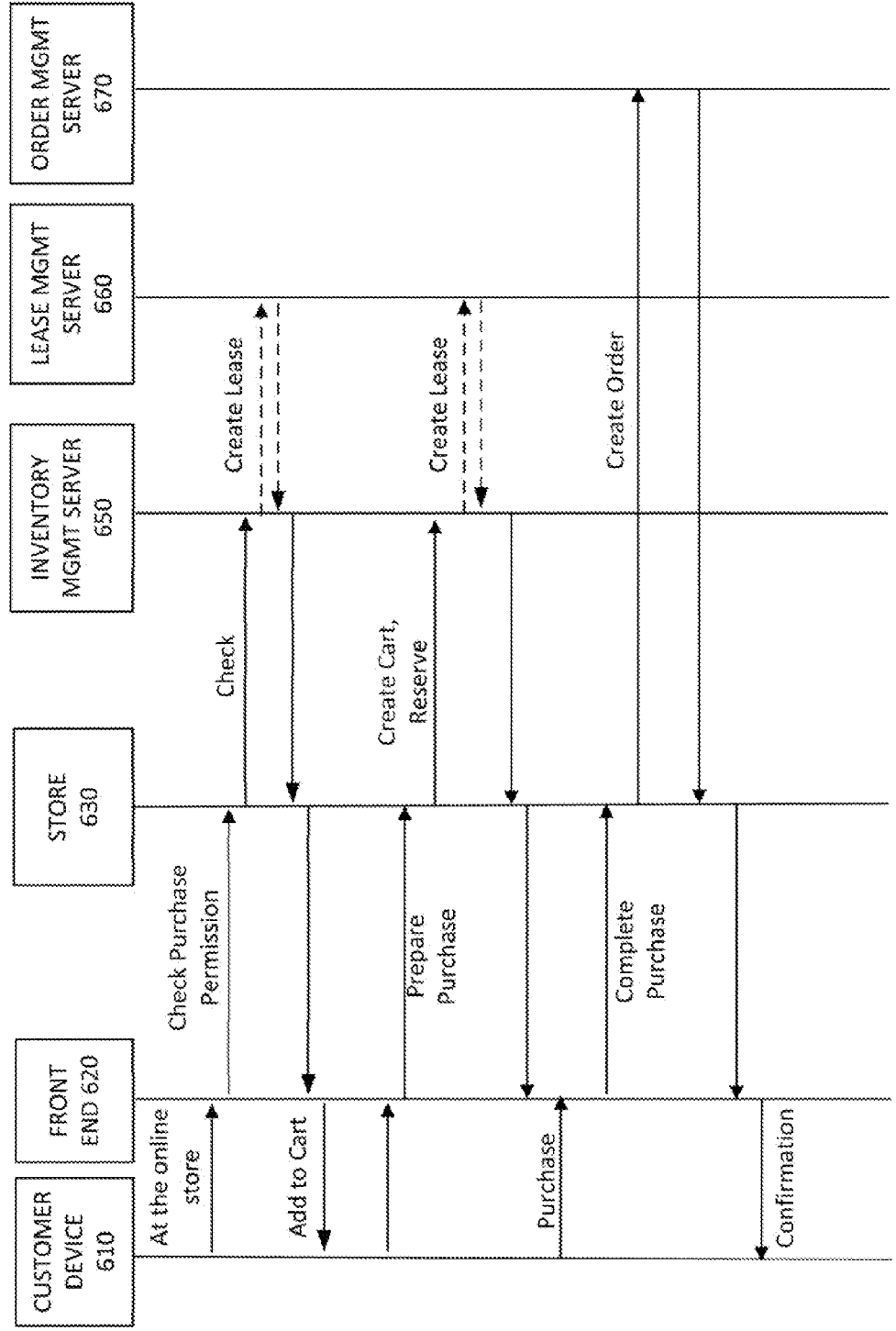
FIG. 6 shows an example of a purchase process and data flow according to an implementation of the disclosed subject matter.

FIG. 6 shows an example of a purchase process and data flow according to an implementation of the disclosed subject matter. The purchase process 600 may include a number of systems that interact with one another. For example, a purchase process may involve a customer device 610, a web front end (FE) 620, a store infrastructure or similar middleware layer 630, an inventory management server 650, a lease management server 660, and an order management server 670. A customer device 610 may access an online store provided through the front end 620. The customer device 610 may wish to purchase a product through the online store. In response to a selection of a product by the customer device 610, the front end 620 may send a request, such as a check purchase permission request, to the store infrastructure 630 to confirm if the purchase may be started. The store may perform a check to see if the selected product is available to the inventory management server 650. If the inventory management server 650 has an inventory lease for the selected specific product in memory, it may return a signal with minimal delay, to the front end 620 that the product is available. The delay typically may be user imperceptible, for example, on the order of 10 ms-400 ms according to embodiments of the presently disclosed subject matter. Alternatively, if an inventory lease for the selected specific product is not stored in memory, the inventory management server 650 may request an inventory lease from the lease management server 660. In such a case, the inventory lease for the specific product may be created, for example, as described above. There may be minimal system latency with this process. When a check for the product is returned with an affirmative indication that the product is available, the front end 620 may indicate to the customer device 610 that the product has been added to the customer device 610 shopping cart.

The customer device 610 may indicate an attempt to purchase the product. The customer device 610 indication may be forwarded to the front end 620 that processes data in preparation for the purchase of the product. The processed data may be forwarded to a store infrastructure or similar middleware layer 630, which may create a cart that may include information related to the customer device 610 cart and measuring the progress of the purchase of the products in the cart. The store 630 may receive the cart information and may attempt to reserve the product for the customer by sending a request to the inventory management server 650. If an inventory lease for the specific product is not maintained in cache, another lease may be obtained. Once the product has been reserved, the customer device 610 may provide additional information to complete the purchase. The FE 620 may process the additional information received from the customer device 620, and may forward an indication to complete the purchase to the store infrastructure 630. The store 630 may send a purchase notification request, which may include a status of the purchase, to the order management server 670. The order management server 670 may process the purchase notification request and may store data related to the purchase in an order data store. Upon completion of the processing of the purchase notification request, the order management server 670 may return a confirmation to the customer device 610.

Figure 7:
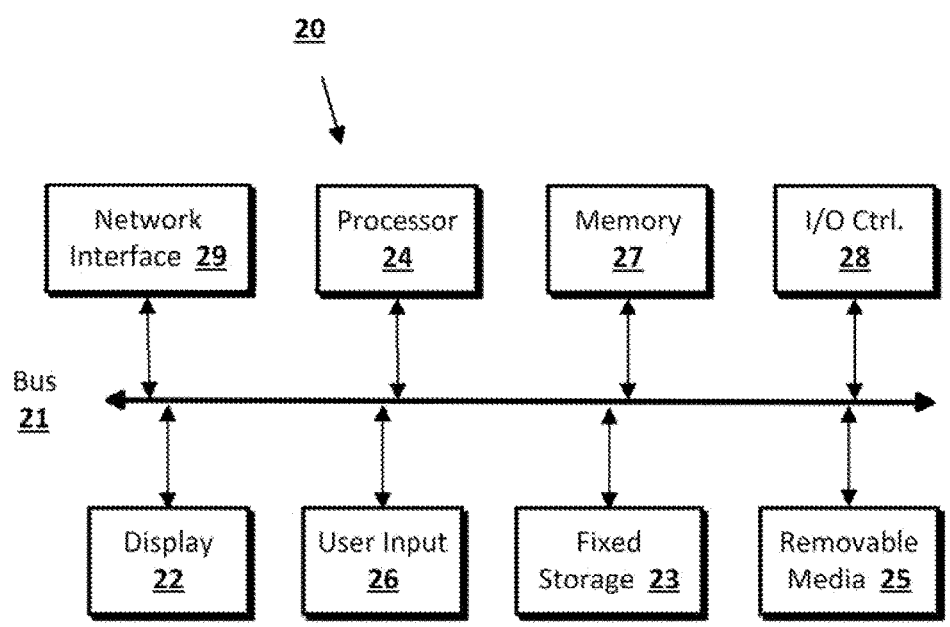
FIG. 7 shows a computer according to an implementation of the disclosed subject matter.

FIG. 7 shows an example computer according to an implementation of the disclosed subject matter. Implementations of the presently disclosed subject matter may be implemented in and used with a variety of component and network architectures. FIG. 7 is an example server or computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer 20 to communicate with other computers or servers via one or more local, wide-area, or other networks, as shown in FIG. 1.

Many other devices or components (not shown) may be connected in a similar manner (e.g., document scanners, digital cameras and so on). Conversely, all of the components shown in FIG. 7 need not be present to practice the present disclosure. The components can be interconnected in different ways from that shown. The operation of a computer such as that shown in FIG. 7 is readily known in the art and is not discussed in detail in this application. Code to implement the present disclosure can be stored in computer-readable storage media such as one or more of the memory 27, fixed storage 23, removable media 25, or on a remote storage location.

More generally, various implementations of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method for managing information about inventory, comprising:
    identifying, by a first server, a total quantity of an inventory of a specific product available for distribution within a specific duration of time;
    obtaining, by the first server, data related to sales of the specific product at a plurality of geographic locations;
    determining, by the first server, based on the data, and for each of the plurality of geographic locations, a corresponding rate of the sales of the specific product;
    preparing, by the first server, based on a result of the determining based on the data, and for each of a plurality of second servers that corresponds to one of the plurality of geographic locations, a corresponding inventory lease, the corresponding inventory lease specifying a first sub-quantity of the total quantity and a first expiration time for the corresponding inventory lease; and
    transmitting, from the first server to the each of the plurality of second servers via an electronic network, the corresponding inventory lease, the corresponding inventory lease configured to allow a corresponding second server to process orders for the specific product, from user devices proximate to the corresponding second server thereby reducing processing bottlenecks, rather than having the orders processed by a different second server, the different second server more distant from the user devices than the corresponding second server, the corresponding lease configured to limit an amount of the specific product distributed, prior to the first expiration time, to the first sub-quantity so that the first server controls distribution of the total quantity of the inventory of the specific product.

2. The method of claim 1, further comprising determining, by the first server and based on the corresponding rate of the sales of the specific product, the first expiration time for the corresponding inventory lease.

3. The method of claim 2, wherein the determining the first expiration time for the corresponding inventory lease is according to a relationship in which a duration of time between the transmitting the corresponding inventory lease and the first expiration time is inversely proportional to the corresponding rate of the sales of the specific product.

4. The method of claim 1, further comprising determining, by the first server and based on the corresponding rate of the sales of the specific product, the first sub-quantity of the total quantity of the inventory of the specific product available for distribution within the specific duration of time.

5. The method of claim 4, wherein the determining the first sub-quantity comprises aggregating data from all second servers related to the specific product.

6. The method of claim 5, wherein the determining the first sub-quantity is based on at least one of a location of a data center directly contactable by at least one of the user devices, a product country, a remaining inventory of the specific product, a global consumption rate of the specific product, a locale specific consumption rate, a consumption rate of at least one of the plurality of second servers, a peak load time for the at least one of the plurality of second servers, a current time of day, an historical sales trend for a product similar to the specific product, or an estimated sell out date of the specific product.

7. The method of claim 1, wherein the transmitting to one of the each of the plurality of second servers is in response to a request, received by the first server, from the one of the each of the plurality of second servers.

8. The method of claim 1, further comprising:
    receiving, by the first server and from one of the each of the plurality of second servers, a request for an additional inventory lease;
    obtaining, by the first server and in response to the request, updated data related to the sales of the specific product at the plurality of geographic locations;
    determining, by the first server, based on the updated data, and for the each of the plurality of geographic locations, an updated corresponding rate of the sales of the specific product;
    preparing, by the first server, based on a result of the determining based on the updated data, and for the one of the each of the plurality of second servers, the additional inventory lease, the additional inventory lease specifying a second sub-quantity of the total quantity and a second expiration time for the additional inventory lease; and
    transmitting, from the first server to the one of the each of the plurality of second servers via the electronic network, the additional inventory lease.

9. The method of claim 8, wherein the receiving occurs in response to a quantity of the specific product associated with the corresponding inventory lease being less than a threshold.

10. The method of claim 8, wherein the receiving occurs in response to a time being within a threshold of the first expiration time.

11. The method of claim 1, further comprising identifying, by the first server, the plurality of second servers.

12. The method of claim 11, wherein the identifying the plurality of second servers comprises performing a hash function to obtain a set of second servers that are available to the first server.

13. The method of claim 12, wherein an input of the hash function comprises at least one of a storekeeping unit identification of the specific product or a country being served by at least one of the plurality of second servers.

14. The method of claim 12, further comprising selecting, by the first server, a master second server from the plurality of second servers.

15. The method of claim 11, further comprising performing, by the first server, a status check of at least one of the plurality of second servers.

16. The method of claim 15, further comprising performing, by the first server and in response to a result of the status check being that the at least one of the plurality of second servers is not operating properly, a hash function to identify, among the plurality of second servers, a properly operating second server.

17. The method of claim 16, wherein an input of the hash function comprises at least one of a storekeeping unit identification of the specific product or a country related to distribution of the specific product.

18. A method for managing information about inventory, comprising:
   identifying, by a first server, a total quantity of an inventory of a specific product available for distribution within a specific duration of time;
   obtaining, by the first server, data related to sales of the specific product at a plurality of geographic locations;
   determining, by the first server, based on the data, and for each of the plurality of geographic locations, a corresponding rate of the sales of the specific product;
   identifying, by the first server, a plurality of second servers;
   performing, by the first server, a status check of at least one of the plurality of second servers;
   performing, by the first server and in response to a result of the status check being that the at least one of the plurality of second servers is not operating properly, a hash function to identify, among the plurality of second servers, a properly operating second server, wherein the hash function uses a hashing algorithm based on consistent hashing;
   preparing, by the first server, based on a result of the determining based on the data, and for each of the plurality of second servers that corresponds to one of the plurality of geographic locations, a corresponding inventory lease, the corresponding inventory lease specifying a first sub-quantity of the total quantity and a first expiration time for the corresponding inventory lease; and
   transmitting, from the first server to the each of the plurality of second servers via an electronic network, the corresponding inventory lease, the corresponding inventory lease configured to allow a corresponding second server to process orders for the specific product, from user devices proximate to the corresponding second server, rather than having the orders processed by a different second server, the different second server more distant from the user devices than the corresponding second server, the corresponding lease configured to limit an amount of the specific product distributed, prior to the first expiration time, to the first sub-quantity so that the first server controls distribution of the total quantity of the inventory of the specific product.

19. A first server, comprising:
   a processor configured to:
      identify a total quantity of an inventory of a specific product available for distribution within a specific duration of time;
      obtain data related to sales of the specific product at a plurality of geographic locations;
      determine, based on the data and for each of the plurality of geographic locations, a corresponding rate of the sales of the specific product; and
      prepare, based on a result of a determination of the corresponding rate and for each of a plurality of second servers that corresponds to one of the plurality of geographic locations, a corresponding inventory lease, the corresponding inventory lease specifying a sub-quantity of the total quantity and an expiration time for the corresponding inventory lease; and
   a network interface configured to transmit, to the each of the plurality of second servers via an electronic network, the corresponding inventory lease, the corresponding inventory lease configured to allow a corresponding second server to process orders for the specific product, from user devices proximate to the corresponding second, server thereby reducing processing bottlenecks, rather than having the orders processed by a different second server, the different second server more distant from the user devices than the corresponding second server, the corresponding lease configured to limit an amount of the specific product distributed, prior to the expiration time, to the sub-quantity so that the first server controls distribution of the total quantity of the inventory of the specific product.

20. A non-transitory computer-readable medium storing computer code for controlling a processor, the computer code including instructions to cause the processor to:
   identify a total quantity of an inventory of a specific product available for distribution within a specific duration of time;
   obtain data related to sales of the specific product at a plurality of geographic locations;
   determine, based on the data and for each of the plurality of geographic locations, a corresponding rate of the sales of the specific product;
   prepare, based on a result of a determination of the corresponding rate and for each of a plurality of second servers that corresponds to one of the plurality of geographic locations, a corresponding inventory lease, the corresponding inventory lease specifying a sub-quantity of the total quantity and an expiration time for the corresponding inventory lease; and
   transmit, to the each of the plurality of servers via an electronic network, the corresponding inventory lease, the corresponding inventory lease configured to allow a corresponding server to process orders for the specific product, from user devices proximate to the corresponding server thereby reducing processing bottlenecks, rather than having the orders processed by a different server, the different server more distant from the user devices than the corresponding second server, the corresponding lease configured to limit an amount of the specific product distributed, prior to the expiration time, to the sub-quantity so that the processor controls distribution of the total quantity of the inventory of the specific product.

21. A first server, comprising:
a processor configured to:
- identify a total quantity of an inventory of a specific product available for distribution within a specific duration of time;
- obtain data related to sales of the specific product at a plurality of geographic locations;
- determine, based on the data and for each of the plurality of geographic locations, a corresponding rate of the sales of the specific product;
- identifying a plurality of second servers;
- perform a status check of at least one of the plurality of second servers;
- perform, in response to a result of the status check being that the at least one of the plurality of second servers is not operating properly, a hash function to identify, among the plurality of second servers, a properly operating second server, wherein the hash function uses a hashing algorithm based on consistent hashing; and
- prepare, based on a result of a determination of the corresponding rate and for each of the plurality of second servers that corresponds to one of the plurality of geographic locations, a corresponding inventory lease, the corresponding inventory lease specifying a sub-quantity of the total quantity and an expiration time for the corresponding inventory lease; and a network interface configured to transmit, to the each of the plurality of second servers via an electronic network, the corresponding inventory lease, the corresponding inventory lease configured to allow a corresponding second server to process orders for the specific product, from user devices proximate to the corresponding second server, rather than having the orders processed by a different second server, the different second server more distant from the user devices than the corresponding second server, the corresponding lease configured to limit an amount of the specific product distributed, prior to the expiration time, to the sub-quantity so that the first server controls distribution of the total quantity of the inventory of the specific product.

22. A non-transitory computer-readable medium storing computer code for controlling a processor, the computer code including instructions to cause the processor to:
- identify a total quantity of an inventory of a specific product available for distribution within a specific duration of time;
- obtain data related to sales of the specific product at a plurality of geographic locations;
- determine, based on the data and for each of the plurality of geographic locations, a corresponding rate of the sales of the specific product;
- identify a plurality of second servers;
- perform a status check of at least one of the plurality of second servers;
- performing, in response to a result of the status check being that the at least one of the plurality of second servers is not operating properly, a hash function to identify, among the plurality of second servers, a properly operating second server, wherein the hash function uses a hashing algorithm based on consistent hashing;
- prepare, based on a result of a determination of the corresponding rate and for each of the plurality of second servers that corresponds to one of the plurality of geographic locations, a corresponding inventory lease, the corresponding inventory lease specifying a sub-quantity of the total quantity and an expiration time for the corresponding inventory lease; and
- transmit, to the each of the plurality of servers via an electronic network, the corresponding inventory lease, the corresponding inventory lease configured to allow a corresponding server to process orders for the specific product, from user devices proximate to the corresponding server, rather than having the orders processed by a different server, the different server more distant from the user devices than the corresponding second server, the corresponding lease configured to limit an amount of the specific product distributed, prior to the expiration time, to the sub-quantity so that the processor controls distribution of the total quantity of the inventory of the specific product.

* * * * *